Figure 1:
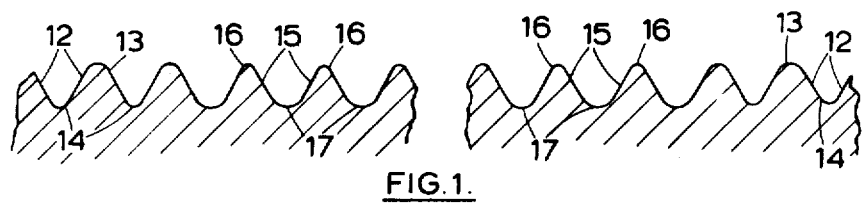

United States Patent [19]

Jones et al.

[11] 4,237,948
[45] Dec. 9, 1980

[54] SCREW THREADED MEMBERS AND THEIR MANUFACTURE

[75] Inventors: Ernest Jones, Walsall; John L. Hall, Wednesbury, both of England

[73] Assignee: Rubery Owen Fasteners Limited, Wednesbury, England

[21] Appl. No.: 960,553

[22] Filed: Nov. 14, 1978

Related U.S. Application Data

[63] Continuation of Ser. No. 781,988, Mar. 28, 1977, abandoned.

[30] Foreign Application Priority Data

Mar. 31, 1976 [GB] United Kingdom .............. 12870/76

[51] Int. Cl.³ ............................................. F16B 39/30
[52] U.S. Cl. .................................................. 151/22
[58] Field of Search ................... 151/22, 14 R; 85/46; 10/10 R

[56] References Cited

U.S. PATENT DOCUMENTS

| | | | |
|---|---|---|---|
| 3,520,344 | 7/1970 | Gabbey | 151/22 |
| 3,530,920 | 9/1970 | Podell | 151/22 |
| 3,701,372 | 10/1972 | Breed | 151/22 |

Primary Examiner—Ramon S. Britts
Attorney, Agent, or Firm—Schrivener, Parker, Scrivener and Clarke

[57] ABSTRACT

An externally screw threaded member of the self-locking, prevailing torque type has a series of convolutions of a standard thread form, and a locking series of convolutions of the same thread pitch as the standard series but of wider section and with incomplete thread crests. When the member is mated with an internal thread of standard form complementary to the standard series, the locking series of convolutions have an interference fit with the internal thread. In consequence of the interference fit one or both flank portions of each convolution of the locking series are caused to be swaged to some extent towards the crest region.

8 Claims, 11 Drawing Figures

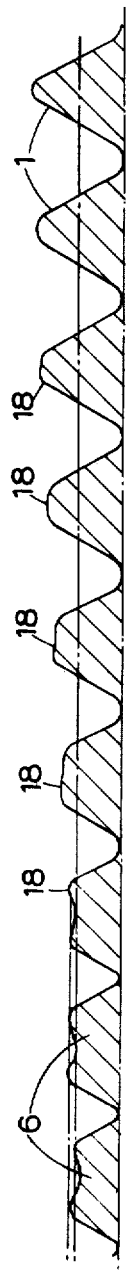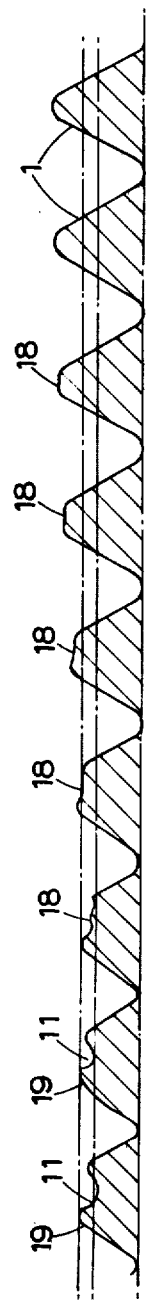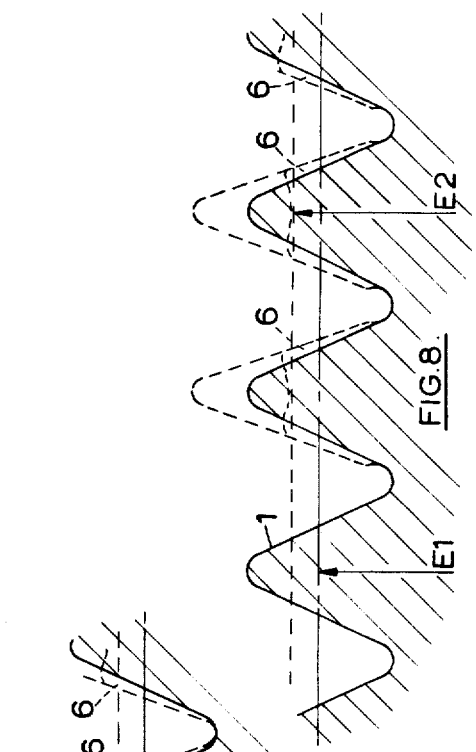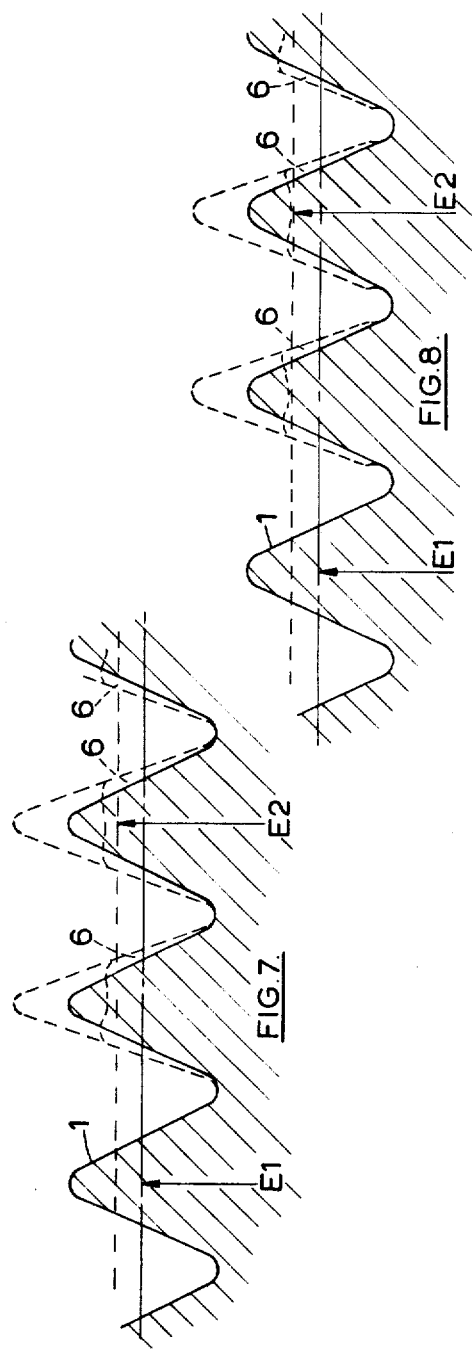

SCREW THREADED MEMBERS AND THEIR MANUFACTURE

This is a continuation of application Ser. No. 781,988 filed Mar. 28, 1977, now abandoned.

This invention relates to externally screw threaded members of the self-locking, prevailing torque type and to apparatus for and a method of making the same.

Numerous proposals have been made to fill the requirements of industry for a satisfactory readily made and inexpensive re-usable prevailing torque type external screw threaded fastener, but the requirement still remains largely unfulfilled.

The solutions proposed fall into two basic categories—a special bolt and nut (or tapped hole) combination and a special bolt. In all cases some deviation from a standard thread form is proposed, whether this be dimensional or by some abnormality or deformity of the screw threads. This is necessary to provide a prevailing torque condition to ensure security of the fastener against accidental release. The deviation has to be such as to take up the fairly substantial clearances which can exist between a male thread at minimum standard tolerance and the mating female thread at maximum standard tolerance. Over and above this it has to provide interference between the threads but without giving rise to excessive application torque (e.g. when the tolerances are reversed, the male thread being at maximum tolerance and the female thread at minimum tolerance), galling or seizure of the threads. There must also be predictability and repeatability of the prevailing torque characteristic to allow reliable fastening and repeated re-use. These are very onerous requirements.

Solutions have been proposed involving change of thread pitch, thread deformation, crest/root interference, root/crest interference, flank interference—with or without root relief—and various combinations of these.

As an example of the special bolt and nut combination there is the American Class 5 Interference fit. The external and mating internal screw threads are of standard form but made to dimensions and tolerances such that the threads have an interference fit along the flanks. The external screw threads have a larger root, or minor, diameter than do standard threads. Complete threads are formed but the external threads have flat truncated crests of smaller major diameter than a standard external thread in order to provide clearance into which metal from the flanks can be swaged in use. This combination is necessarily more expensive to produce than standard bolts and nuts and the achievement of the necessary close tolerances for the female thread does present production difficulties. Production is further complicated if a bolt shank is required to have standard, for example Class 2A fit, threads, for ease of assembly, over part of its length and Class 5 fit threads over another part thereof as this necessitates the use of a stepped diameter blank. These are not commercially satisfactory for repetitive re-use due to loss of the intended interference condition.

In U.S. Pat. Nos. 3,526,914 and 3,701,372 Breed has proposed to modify the Class 5 Interference fit external thread by diametral and axial relief at the thread roots and reduction of the lock thread major diameter—i.e. further truncating the thread crests. This to to provide additional clearance at root and crest to accommodate metal swaged from the flanks. He maintains flank interference within the Class 5 fit limits. The relief at the root necessarily involves some weakening of the shank of the threaded member.

In U.S. Pat. No. 2,787,796 Rosan discloses the conversion of a formed standard external thread into a locking thread by deforming a conventional truncated thread crest to provide interference with a mating internal thread adjacent the root thereof. There is no flank interference between the threads.

McDonald, U.S. Pat. No. 2,679,774, seeks a similar effect by providing an extension to the crest of a standard external thread to take up the clearance at the root of a mating internal thread and provide a desired level of friction for locking a bolt in place. In U.S. Pat. No. 2,352,540 Hanneman does the converse by providing an increased root diameter at a locking thread portion so as to provide an interference fit with the crest of a mating internal thread. Any swaging which takes place due to the interference fit is likely to be of the crest of the internal thread so as to take up clearance between the thread flanks in the crest area of the female thread. In both of these patents there is no flank interference between mating threads.

U.S. Pat. No. 3,530,920 of Podell discloses an external self-locking thread in which parts of the adjacent turns are inclined towards each other and the thread angle of the groove between them is reduced. Those thread parts have an appreciably increased root diameter and an increased width along the pitch line with the result that the crests are slightly truncated and of reduced major diameter. Considerable interference is produced at the flanks of a mating internal thread and there is yet more interference at the crests of the internal thread.

In British Pat. No. 687,622 to Dodge et al an external locking thread is proposed in which there is full thread formation with constant major diameter and a combination of decreased lead (i.e. reduction of pitch) together with increase of root and pitch diameters. The pitch diameter is increased by an amount of the difference between the basic pitch diameters of standard mating external and internal threads plus 0.001 in., stated to be a more or less arbitrary amount. This provides a complex frictional engagement due to interference caused by the pitch change, crest interference with the root of a mating female thread and flank interference due to the increased pitch diameter. It appears there may also be root interference with the crest of a mating female thread. Examination of the proposed pitch diameter increases shows that these are within the Class 5 limits.

According to one aspect, the present invention consists in an externally screw threaded member comprising first and second series of thread convolutions both of which series have the same thread pitch, the first series being of a standard thread form and having a first effective diameter, and the second series having a theoretical effective diameter (the second effective diameter) which is larger than the first effective diameter, the thread of the second series having an incomplete crest and being of wider section at the first effective diameter than the thread of the first series so as to provide an interference fit with the thread of a co-operating internally threaded member of a complementary standard form to the thread of the first series, such that the thread of the second series has a portion thereof which is extruded outwardly to the crest region on engagement with the internally threaded member.

In addition to the first and second series of thread convolutions there may be an intermediate series of thread convolutions of a transitional form which connects the first and second series.

Whilst the term "series of thread convolutions" is used herein it is to be understood that this may comprise a single convolution. A single convolution of the first series may be sufficient, particularly where the total threaded length of the member is short. A single convolution of the second series may, for example, be sufficient for some of the smaller diameter threaded members as with these the thread clearances are smaller, thread strengths are relatively low and prevailing torque requirements for locking are of a lower order. Usually there will be at least two full convolutions in the thread of the second series. The transition between the first and second series thread convolutions may be effected in a single convolution.

Generally a screw threaded member according to this invention will include first series thread convolutions to either side of the second series thread convolutions. Depending on the threaded length of the member there may be second series thread convolutions separated by first series thread convolutions.

Desirably the incomplete crest is formed at or above the first effective diameter.

Preferably the root diameter of the second series thread convolutions is equal to or greater than that of the first series.

In the event that the incomplete crest is formed below the first effective diameter than the width of the second series thread convolutions at the first effective diameter is the distance between the extended flank lines of the thread measured at the first effective diameter.

According to another aspect, this invention consists in a thread rolling die for externally screw threading a member, comprising a body formed with a plurality of equispaced ridges of substantially V-shaped cross-section which provide thread root-forming crests alternating with grooves which provide thread crest-forming roots and in which there are at least two adjacent ridges which are narrower in cross-section at least at the mid-height thereof than the said other ridges, whereby a first series of thread convolutions formed on a cylindrical member by said other ridges have a first effective diameter, and a second series of thread convolutions formed on the member by said adjacent ridges have the same thread pitch as the first series and have a theoretical effective diameter (the second effective diameter) which is larger than the first effective diameter such that the thread of the second series is formed with an incomplete crest and has a wider cross-section at the first effective diameter than the thread of the first series so as to provide an interference fit with the thread of a co-operating internally threaded member of a complementary form to the thread of the first series, and such that the thread of the second series has a portion thereof which is extruded outwardly to the crest region on engagement with the internally threaded member.

The thread of the second series may have the same thread angle as the thread of the first series, or it may be smaller.

The said adjacent ridges may be of the same height as the other ridges or of slightly less or greater height. In the former case the root diameter of the formed threads of the first and second series will be the same whilst in the other cases the root diameter of the thread of the second series will be slightly larger or smaller respectively. The height of the said adjacent ridges may be such that the increased root diameter of the formed thread of the second series in such as to take up the clearance from the crests of engaging threads of a female threaded member or there may even be a slight interference between the two.

Preferably the height of the said adjacent ridges is equal to or less than that of the other ridges.

Our invention further resides in a method of forming an external thread on a member comprising producing on the member a first series of thread convolutions having a first effective diameter, and a second series of thread convolutions of the same thread pitch as the first series and having a theoretical effective diameter which is larger than the first effective diameter such that the thread of the second series is formed with an incomplete crest and has a wider cross-section at the first effective diameter than the thread of the first series.

The term "effective diameter", e.g. the first effective diameter, as used herein, is the diameter measured across a thread midway between opposed roots and crests.

The term "theoretical effective diameter", i.e. the second effective diameter, as used herein, refers to the diameter of a thread (of the second series) midway between opposed roots and crests assuming that the thread form continues to a normal crest at which a continuation of the thread flank lines meet.

The "thread angle" is the angle between the flanks of a thread.

The term "incomplete crest" refers to the crest form arising from the fact that the formed thread of the second series has widened flanks and because of this there is insufficient material in the blank from which, for example, a bolt is made to form a normal or complete crest at the junction of a normal continuation of the thread flank lines.

Figure 2:
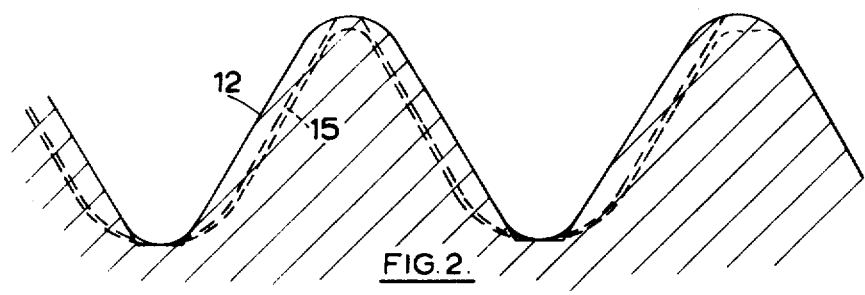
Figure 5:
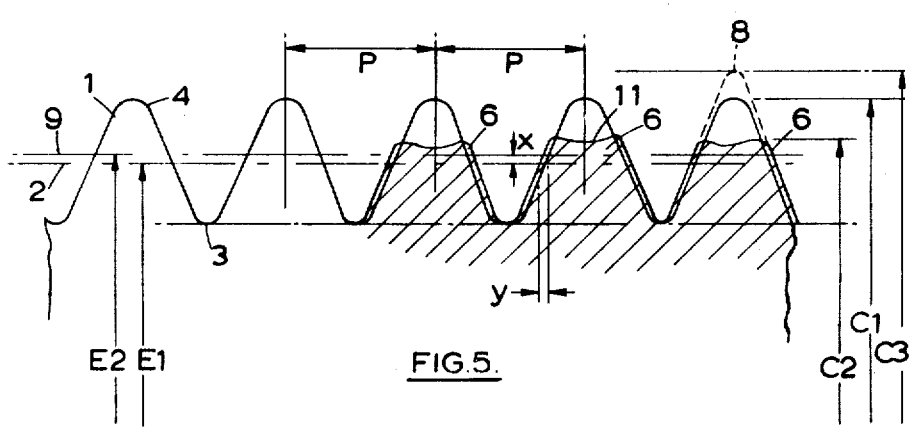
Figure 6:
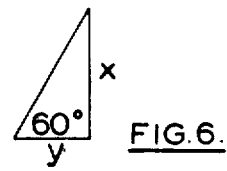
Figure 9:
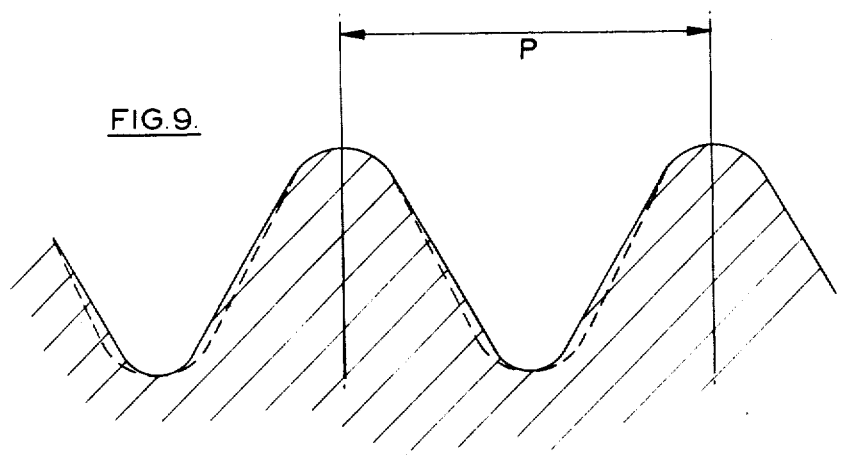
Figure 10:
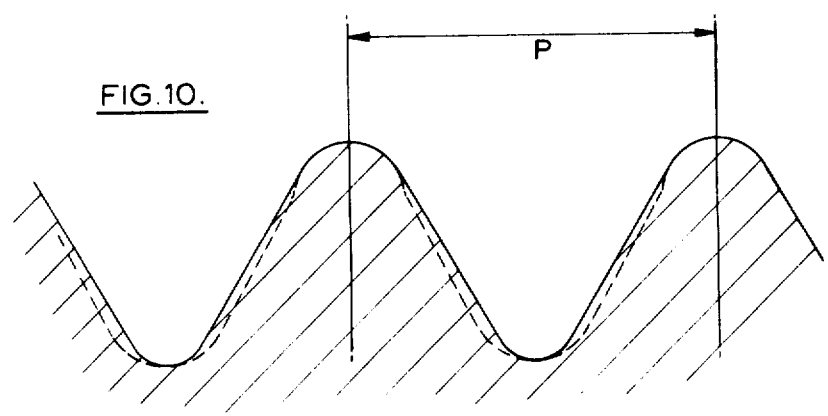
Figure 11:
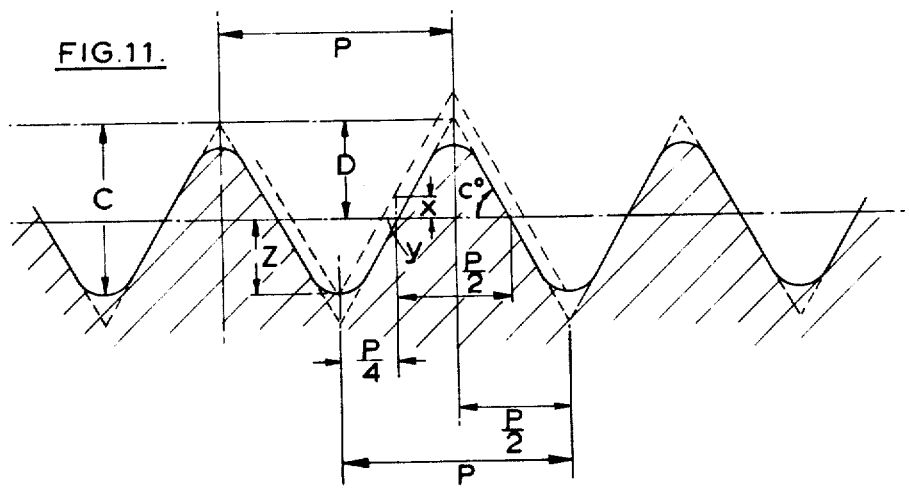

Embodiments of the invention will now be described by way of example with reference to the accompanying drawings in which:

FIG. 1 is a section through two parts of a thread rolling die normal to the ridges, FIG. 2 is an enlarged view of die ridges, FIG. 3 is an enlarged section of thread convolutions of a first, intermediate and second series as rolled on an externally screw threaded member, FIG. 4 is an enlarged section of the thread convolutions of the first, intermediate and second series as in FIG. 3 but after traverse by a nut, FIG. 5 is an exaggerated section showing first and second series thread convolutions superimposed, FIG. 6 shows the relationship between increase of flank width, increase of effective diameter and the angle of inclination of the flanks of a thread, FIGS. 7 and 8 are similar to FIG. 5 but show alternative thread forms for the second series of thread convolutions, FIGS. 9 and 10 are enlarged sections (as in FIG. 2) through thread rolling dies for producing the thread forms of FIGS. 7 and 8 respectively, and FIG. 11 shows a standard screw thread and the dimensions thereof.

Referring first to FIG. 5, there is shown a half section through a standard thread 1 on an externally screw threaded member such as a bolt. The broken line 2 passes through the thread midway between its root 3 and its crest 4. The distance between line 2 and a corresponding line through the opposed half of the thread is the first effective diameter E1. The thread 1 provides a first series of thread convolutions. A thread 6 of a second series of thread convolutions is shown superimposed on the first series thread 1. As is seen the second series thread 6 is wider at the flanks than the thread 1 by an amount "y" on each flank measured parallel to the thread axis. If the flanks of thread 6 are notionally extended to form a normal or complete crest as at 8 to include a thread angle which is the same as that of the thread 1, then the effective diameter, E2, of this thread is given by the distance between the broken line 9, which is midway between the crest and root, and a corresponding line through the opposed half of the thread. This, however, is a theoretical effective diameter because the thread 6 does not rise to a crest as at 8, there being insufficient material in the bolt blank to form such a crest because the material which would have formed a normal crest is now on the widened flanks of the thread.

E2 is greater than E1 by an amount "2 x" and the width of the thread 6 at line 2, that is on the first effective diameter, is greater by an amount "2 y" than the width of the thread 1. The relative crest diameters are indicated by C1 for the standard thread 1, C2 for the second series thread 6 and C3 for the second series thread 6 extrapolated to a normal crest as at 8. The root diameters of the threads 1 and 6, as illustrated, are the same, and the pitch P of the threads 1 and 6 is the same. The root of the thread 6 is narrower than the root of thread 1 in this example. The root diameters the threads 1 and 6 do not necessarily have to be the same.

FIG. 6 shows the relationship between increased effective diameter, increased flank thickness and angle of inclination of the flanks of a thread, taken in this case for the purposes of illustration as the usual 60°. From this it will be seen the relationship is:

$$x = y \tan 60°$$

A cross-section through a die for rolling the first and second series thread convolutions is shown in FIGS. 1 and 2. In FIG. 1 parallel spaced ridges for forming the standard thread of the first series are shown at 12. These have thread root-forming crests 13 and thread crest-forming roots 14. Similar equispaced ridges 15 have thread root-forming crests 16 and thread crest-forming roots 17. The flanks of the ridges 15 have been cut back or reduced whereby these ridges are of thinner section than the ridges 12. Because of this it will also be seen that the roots 17 are wider than the roots 14.

The difference between the ridges 12 and 15 is shown more clearly in FIG. 2, in which both are shown together on a larger scale for comparison. As seen in FIG. 2, the ridge 15 is symmetrical about a vertical plane passing through the crest of the ridge, that is to say both flanks of the ridge have been cut back an equal amount as compared with the ridge 12. The reduction in width of the ridge 15 could however be effected by cutting back one flank alone or by cutting back one flank more than the other. If however this leads to excessive reduction of the height of the crest it will lead to interference between the root of a formed thread on a bolt or other externally threaded member made from the die and the crest of the thread of a mating female threaded member. This could have undesirable consequences causing distortion of the female thread, excessive application torque, galling of the threads of even seizure. Whether or not differential relief of the flanks of the ridge 15 is desirable, or practicable, in any particular case will depend on the size and characteristics of the thread and also the specified manufacturing tolerances for both male and female threads, as these determine the potential range of clearances between the threads when assembled. Differential relief on the flanks will cause a small change in pitch of a formed thread over the transition between the first and second series thread convolutions.

Referring now to FIG. 3, this shows an enlarged section of the formed first series thread 1, the second series thread 6 and an intermediate thread 18 in a transitional region between threads 1 and 6.

FIG. 4 is similar to FIG. 3 but shows a change in thread form which has taken place in the thread 6 and in some of the convolutions of the intermediate thread 18 following the application and subsequent removal of a nut which has been engaged initially with the first series thread 1 and screwed over the intermediate and second series threads 18 and 6 respectively.

Of particular note is the enhanced shape of the medial dip in the crest 11 of the thread 6 caused by upward extrusion of the flanks of the thread above line 2 and into the crest region, particularly of the flanks 19 remote from the first series thread 1 which first enters the nut. A further degree of extrusion takes place with subsequent nut applications and removals. There is a prevailing torque locking effect between the bolt and the nut (or a tapped hole etc.) due to thread flank interference and also due to a degree of elastic deformation of the second series thread in the crest region, especially at the flanks 19 remote from the first series thread 1, as shown in FIG. 4.

In a particular example bolts according to the invention were made having the thread forms as illustrated in FIGS. 3 and 4. These bolts were M8×1.25 mm pitch made from bolt blanks formed to the nut minimum tolerance effective diameter ±0.0127 mm. The dies were designed to roll the second series thread 6 such that the increase of effective diameter, that is E2-E1 (see FIG. 5), was 22% of the thread pitch. To achieve this each flank of the adjacent ridges for forming the second series thread was relieved by 0.0762/0.889 mm (as compared with the ridges for forming the first series thread 1). The relieved ridges were consequently 0.1524/0.1778 mm thinner than the ridges for forming the first series thread. The mean helix angle for the second series thread as formed was 30° 5¼' compared with 3° 12⅛' for the standard, first series, thread.

The dies were designed to form in succession three full convolutions of standard thread form at the free end of the blanks, a thread of a transitional form, four convolutions of the second series thread, a transitional thread and then the standard thread again so as to complete threading of the shank up to the head of the bolt. After rolling of the threads the bolts were hardened and then tempered to 80 Kg.f/mm² minimum U.T.S. Different samples of bolts were finish treated by phosphating with the addition of oil, by zinc plating and by cadmium plating.

It was found that lubrication of the threads for assembly was desirable to facilitate an orderly extrusion of the threads of the second series.

Whilst FIGS. 3 and 4 show five convolutions of the intermediate thread 18 between the threads 1 and 6 the transition may in fact be effected over as little as a single convolution. The convolutions of the second series thread may all have the same theoretical effective diameter, or alternately successive convolutions may have progressively increasing theoretical effective diameters. That is to say, successive convolutions, or some of them, may have successively increasing flank widths at the first effective diameter. In the example of M8 bolts described above the flank widths of successive convolutions of the second series thread might be increased by, for example, 0.1524/0.1778 mm for the first convolution, 0.2032/0.2286 mm for the second and third convolutions and 0.2540/0.2794 mm for fourth and fifth convolutions. These correspond to means effective diameter increases related to thread pitch of 22%, 28.8% and 35.5% respectively. Such an arrangement would give rise to increasing application and prevailing torques with the extent of thread engagement.

In order to assess the effect of such a change a new set of dies was made from which further M8×1.25 mm bolts were produced. The increase of effective diameter, E2-E1, to which the dies were designed for forming the second series threads was 33% of the pitch. Each flank of the adjacent ridges for forming these threads was relieved by 0.1237 mm nominal as compared with the previous 0.0825 mm nominal, i.e. the mean of 0.0762/0.0889 mm. In consequence these ridges were 0.2474 mm nominal thinner at the first effective diameter than the ridges for forming the first series thread. The mean helix angle reduced to 3° 2' and the crests of the thread root-forming ridges for the second series thread came slightly below the crests of the thread root-forming ridges for the threads of the first series due to the further relief of the flanks resulting in a lowering of the crest, the occurrence of which can be seen by reference to FIG. 2.

In consequence of these changes the section of the second series thread 6 at the first effective diameter increased thereby increasing the flank interference with a mating female thread and providing an enhanced prevailing torque locking effect. In addition the root diameter of the rolled thread of the second series was slightly larger than the root diameter of the rolled thread of the first series and this gave rise to interference with the crest of a mating female thread. It will be apparent that a balance has to be struck between achievement of a desired high prevailing torque locking effect on the thread flanks and the disadvantageous effects of any root/crest interference which may occur. This places an upper limit on the useful increase of effective diameter expressed as a percentage of the thread pitch, but subject in any particular case to the design clearances between male and female threads.

If the root diameter of the second series thread is less than that of the first series there will be increased clearance between the root of the second series thread and the crest of a mating female thread. In consequence material from the flanks of the second series thread is likely to extrude into this clearance volume where it will be progressively of less effect in providing a prevailing torque condition on repeated application and release of the member.

It will have been observed that the flanks of the second series thread 6, seen in FIG. 5, are parallel to the flanks of the first series thread 1 which they have replaced, thus maintaining constant pitch through the first, intermediate and second series threads. The form of the thread 6 may, however, be varied in a number of ways. Reference has already been made to differential relief of the flanks and two further variations are indicated in FIGS. 7 and 8. In FIG. 7 the flanks of the thread 6 diverge away from the flanks of the thread 1 which they replace and there is less or even no narrowing of the root width. The thread angle of the thread 6 is less than that of the thread 1. Flanks of the second series thread 6 in FIG. 8 similarly diverge but they are relieved back to the thread 1 form at the root. A similar relief could be applied to the form of the thread 6 of FIG. 5. Sections through the dies for forming the threads 6 of FIGS. 7 and 8 are shown in FIGS. 9 and 10 respectively.

The thread form 6 of FIG. 5 will provide an interference fit with a female threaded member over the height of the threads of the latter from a region inwardly of its effective diameter through to and including its crest. With the thread 6 of the form shown in FIG. 7 or 8 there may not be flank interference at or adjacent the crests of the thread convolutions of a female threaded member and consequently the crests may not be subject to interference when engaged with this form of the thread. Where the thread 6 is of a form which does not have an interference fit with an engaged female thread through to the crests of the latter some extrusion of the thread 6 may occur in use towards its root region into the clearance volume which exists there.

A relationship between the helix angle of the first series thread 1 and that of the second series thread 6 in terms of effective diameter and increase of effective diameter has been developed, referring to FIG. 5, as follows:

| | | |
|---|---|---|
| Increase in effective diameter | = | 2x |
| Pitch | = | P |
| Standard thread mean helix angle | = | a |
| Second series thread mean helix angle | = | b |
| P | = | E1 tan a |
| P | = | E2 tan b |
| Whence tan b | = | $\frac{E1}{E2}$ tan a |
| | = | E1 + $\frac{E1}{2x}$ |
| $\frac{\tan a}{E1 + 2x}$ | = | E1 $\frac{\tan a}{\tan b}$ |
| 2x | = | E1 ($\frac{\tan a}{\tan b}$ − 1) |

FIG. 11 shows standard screw thread dimensions. There is also indicated in that Figure the flanks of a second series thread such that the root of the latter coincides with the root of the standard thread. For any particular thread there will be a value of E2−E1/P at which this occurs. If E2−E1/P is increased beyond this value then first the clearance between the root of the male thread and the crest of a mating female is encroached upon and further increase will lead to root/crest interference and possible seizure. This value of E2−E1/P may be arrived at as follows:

$$Z = C - D$$
$$= (\frac{P}{4} - y) \tan C$$
$$\frac{Z}{\tan C} = \frac{P}{4} - y$$
$$\text{whence } y = \frac{P}{4} - \frac{Z}{\tan C}$$
$$x = y \tan C$$
$$= (\frac{P}{4} - \frac{Z}{\tan C}) \tan C$$
$$\text{whence } \frac{2x}{P} \text{ (i.e. } \frac{E2 - E1}{P}) = \frac{2}{P}(\frac{P}{4} - \frac{Z}{\tan C}) \tan C$$

$$\frac{2x}{P} = \frac{1}{2} \tan C - \frac{2z}{P}$$

In the case of the Unified and Metric threads the angle C is 60°. For Whitworth and BSF threads which have a 55° thread angle the angle C is 62½°, consequently the term ½ tan c becomes 0.866 for the former threads and 0.96 for the latter threads. In Table I below examples are given of thread sizes in Unified Coarse (UNC), Unified Fine (UNF), Metric Coarse, BSF and Whitworth threads together with the value of $E2-E1/P\%$ at which the root diameter of a second series thread (whose flanks are parallel to the flanks of a standard thread which they have replaced) is the same as the root diameter of the standard thread. It will be seen that these values are consistent within the range 28.6% to 32% over the range of the different threads and sizes which are given. Thus, depending on the thread type, root/crest interference can be expected to commence when $E2-E1/P$ exceeds about 33% in the case of the Whitworth threads and a little less for the other threads listed. However such interference could be obviated by root relief of the thread as described with reference to FIGS. 7 and 8.

TABLE I

| Size of Thread | Pitch (P) | Z (C-D) | $\frac{2z}{P}$ | $\frac{E2-E1}{P}\%$ |
|---|---|---|---|---|
| ¼"–20 UNC | .0500 | .0144 | .576 | 29 |
| 7/16"–14 UNC | .0714 | .0206 | .58 | 28.6 |
| ⅜"–11 UNC | .0909 | .0263 | .58 | 28.6 |
| ⅝"–10 UNC | .100 | .0289 | .578 | 28.8 |
| ¾"–9 UNC | .1111 | .0321 | .58 | 28.6 |
| 1"–8 UNC | .1250 | .0361 | .577 | 28.9 |
| 1¼"–6 UNC | .1667 | .048 | .576 | 29 |
| ¼"–28 UNF | .0327 | .0102 | .572 | 29.4 |
| 1"–12 UNF | .0833 | .0241 | .58 | 28.6 |
| M5 (Metric) | .8 | .230 | .576 | 29 |
| M12 (Metric) | 1.75 | .505 | .577 | 28.9 |
| M24 (Metric) | 3.0 | .866 | .577 | 28.9 |
| M36 (Metric) | 4.0 | 1.155 | .577 | 28.9 |
| ¼"–26 BSF | .0385 | .0123 | .64 | 32 |
| ⅜"–16 BSF | .0625 | .0200 | .64 | 32 |
| ½"–12 BSF | .0833 | .0267 | .64 | 32 |
| 1"–10 BSF | .1000 | .0320 | .64 | 32 |
| ¼"–20 WHIT | .0500 | .0160 | .64 | 32 |
| ⅜"–12 WHIT | .0833 | .0267 | .64 | 32 |
| ½"–10 WHIT | .1000 | .0320 | .64 | 32 |
| 1"–8 WHIT | .1250 | .0401 | .64 | 32 |

Referring now to Table II below, there is set out at a column 1 a selection of UNC thread sizes, column 2 gives the corresponding thread pitch and column 3 lists the internal effective diameters at minimum tolerance (above) and maximum tolerance (below) for the corresponding Class 2B fit internal thread. This is the fit accepted by industry for general industrial applications. Columns 4 and 5 list the corresponding effective diameters for the American Class 5 interference fit for internal and external threads respectively. Column 6 with 7 and 8 with 9 list values of $E2-E1/P\%$ and the corresponding second series (lock) thread effective diameter with standard external thread tolerances applied.

TABLE II

| 1 | 2 | 3 | 4 | 5 | 6 | 7 | 8 | 9 |
|---|---|---|---|---|---|---|---|---|
| Size of Thread | Pitch (P) | Class 2B Fit Internal Effective Diameter | American Class 5 Interference Fit Effective Diamtr. Internal | External | $\frac{E2-E1}{P}\%$ | Lock Thread Effective Diameter | $\frac{E2-E1}{P}$ | Lock Thread Effective Diameter |
| ¼"–20 UNC | .0500 | .2175 .2223 | .2175 .2201 | .2204 .2201 | 16 | .2207 .2230 | 21 | .2232 .2269 |
| 7/16"–14 UNC | .0714 | .3911 .3972 | .3911 .3947 | .3955 .3991 | 15 | .3957 .3957 | 20 | .3992 .3992 |
| ⅜"–11 UNC | .0909 | .5660 .5702 | .5660 .5702 | .5716 .5758 | 15 | .5725 .5780 | 19 | .5761 .5816 |
| ⅝"–10 UNC | .100 | 68.50 .6927 | .6850 .6895 | .6910 .6955 | 14 | .6913 .6972 | 19 | .6963 .7022 |
| ¾"–9 UNC | .1111 | .8028 .8110 | .8028 .8077 | .8095 .8144 | 14 | .8101 .8164 | 18 | .8145 .8208 |
| 1"–8 UNC | .1250 | .9188 .9276 | .9188 .9242 | .9262 .9316 | 13 | .9263 .9331 | 18 | .9327 .9395 |
| 1¼"–6 UNC | .1667 | 1.3917 1.4022 | 1.3917 1.3988 | 1.4018 1.4089 | 13 | 1.4029 1.4110 | 17 | 1.4095 1.4176 |

In relation to columns 3 and 4, it will be seen that for the two classes of fit the minimum effective diameter for each thread size is the same. The maximum effective diameter for the Class 5 fit is less than for the Class 2B fit. Comparing the figures in columns 5 and 3, the minimum effective diameters of column 5 are less than the maximum effective diameters of column 3 for each thread size. Thus a Class 5 fit external thread does not have an interference fit with a Class 2B fit internal thread which is at or towards the maximum tolerance effective diameter and there will not be a prevailing torque locking effect between the two.

Referring now to columns 6 and 8, these list increased effective diameters, expressed as $E2-E1/P\%$, for each thread size, and columns 7 and 9 give the corresponding effective diameters at standard minimum and maximum tolerances. The minimum and maximum effective diameters in column 7 are all greater than the corresponding figures in column 5, so that the column 7 threads have a tighter inteference fit with a Class 5 internal thread than has the Class 5 external thread. The minimum effective diameter threads listed in column 7 have an interference fit with the Class 2B internal thread at minimum, but not at maximum, effective diameter.

The minimum effective diameters quoted in column 9 all give an interference fit with a Class 2B fit internal thread at maximum effective diameter and a greater interference than is provided by the Class 5 external thread at maximum tolerance. It is also seen that as the thread size increases so a smaller increase of external thread effective diameter (E2−E1)/P% is required to give an interference fit and the required prevailing torque locking effect. If a relatively low prevailing torque effect is required a value of E2−E1/P% of as low as 13% can be used, depending on thread size and internal thread class of fit. If a relatively high prevailing torque locking effect is required then a value of E2−E1/P% of up to the region of 33%, depending on type of thread, may be used. Generally a value in the range 17% to 32% is likely to be used most frequently. If the engaged thread length is short a high value may be chosen to provide the desired locking effect. If the engaged threaded length is relatively long then several thread convolutions of the second series may be provided and a low, or relatively low, value of E2−E1/P% may be used.

It will be understood that the externally threaded member of this invention can readily be made so as to be usable with standard internal threads without any requirement for a special class of fit and that a mating internal thread is not deformed in use to any significant extent. The prevailing torque locking effect is maintained at a satisfactory value over repeated applications and releases. It will also be understood that members according to this invention can be made from standard cylindrical blanks whose tolerances can be taken into account in the choice of E2−E1/P% so as to give the desired prevailing torque characteristics.

We claim:

1. An externally screw threaded member comprising a shank produced from a cylindrical blank of constant diameter and formed with a continuous thread having first and second series convolutions of the same thread pitch and the same root diameter, said first series convolutions being of a standard thread form and having a first effective diameter, and said second series convolutions having a theoretical effective diameter (the second effective diameter) which exceeds said first effective diameter by 13% to 35.5% of said thread pitch, said second series convolutions being of less height than said first series convolutions, having incomplete crests of a free, radially uncompressed form, and said second series convolutions being of wider section axially of said shank at said first effective diameter than said first series convolutions, the construction and arrangement being such that said second series convolutions provide an interference fit at their flanks when engaged with a thread of a co-operating internally threaded member having convolutions of a complementary form to said first series convolutions, and a portion of each said crest of said second series convolutions is caused to be extruded outwardly when said second series convolutions are engaged by the thread of such an internally threaded member.

2. An externally screw-threaded member according to claim 1 wherein said second effective diameter exceeds said first effective diameter by 17% to 32% of said thread pitch.

3. An externally screw-threaded member according to claim 1 wherein said incomplete crest is above said first effective diameter.

4. An externally screw-threaded member according to claim 1 wherein an intermediate series of thread convolutions is provided of a transitional form between said first and second series convolutions.

5. An externally screw-threaded member according to claim 4 wherein said intermediate series convolutions have the same thread pitch as said first and second series convolutions.

6. An externally screw-threaded member according to claim 4 wherein said intermediate convolutions have a different thread pitch from said thread pitch of said first and second series convolutions.

7. An externally screw-threaded member according to claim 1 wherein said second effective diameter of a said second series convolution is different from an adjacent one of said second series convolutions.

8. An externally screw-threaded member according to claim 1 wherein said second effective diameter exceeds said first effective diameter by not more than 33% of said thread pitch.

* * * * *